(12) United States Patent
Maeda (10) Patent No.: US 11,513,436 B2
(45) Date of Patent: Nov. 29, 2022

(54) LIGHT SOURCE APPARATUS AND IMAGE PROJECTION APPARATUS

(71) Applicant: CANON KABUSHIKI KAISHA, Tokyo (JP)

(72) Inventor: Yuuki Maeda, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/483,315

(22) Filed: Sep. 23, 2021

(65) Prior Publication Data
US 2022/0100075 A1    Mar. 31, 2022

(30) Foreign Application Priority Data

Sep. 30, 2020   (JP) .............................. JP2020-165336

(51) Int. Cl.
*G03B 33/12*       (2006.01)
*G03B 21/20*       (2006.01)

(52) U.S. Cl.
CPC ......... *G03B 33/12* (2013.01); *G03B 21/2013* (2013.01)

(58) Field of Classification Search
CPC .......................... G03B 33/12; G03B 21/2013
USPC .......................................................... 353/31
See application file for complete search history.

(56) References Cited

U.S. PATENT DOCUMENTS

2021/0356852 A1* 11/2021 Liao ..................... G03B 21/147

FOREIGN PATENT DOCUMENTS

JP    2019-028085 A    2/2019
JP    2019-035922 A    3/2019

* cited by examiner

*Primary Examiner* — Jerry L Brooks
(74) *Attorney, Agent, or Firm* — Canon U.S.A., Inc. IP Division (57) ABSTRACT

An apparatus includes a first emitter configured to emit first color light, a second emitter configured to emit second color light, a plate configured to diffuse the first color light and the second color light, a first lens configured to collimate the diffused first color light, and a second lens configured to collimate the diffused second color light. A predetermined condition is satisfied.

20 Claims, 7 Drawing Sheets

FIG. 6A

LIGHT SOURCE APPARATUS AND IMAGE PROJECTION APPARATUS

BACKGROUND OF THE DISCLOSURE

Field of the Disclosure

The aspect of the embodiments relates to a light source apparatus suitable for an image projection apparatus, i.e., a projector.

Description of the Related Art

Some projectors use laser light sources of three colors of red, green and blue as light sources of illumination light which enters light modulators. However, if laser light from a laser light source is used as it is as the illumination light, an image may flicker on a screen, that is, so-called speckle may occur. Speckle can be reduced by making the laser light enter a diffusion plate, rotating the diffusion plate with a motor to acquire diffused light, and using the diffused light as the illumination light.

On the other hand, light outputs from laser light sources of three colors are different from each other, and hence the number of laser light sources required to acquire a proper white balance of illumination light are different depending on color among the three colors. In particular, the light output from a blue laser light source is higher than the respective light outputs from red and green laser light sources, and thus the number of blue laser light sources is less than the respective numbers of the red and green laser light sources. As a result, an incident angle distribution on the diffusion plate of the blue laser light is different from incident angle distributions of the red and green laser light, which causes color unevenness on a projected image.

Japanese Patent Laid-Open No. ("JP") 2019-028085 discloses a projector which hinders color unevenness from occurring by making a diffusion plate have a diffusion characteristic of blue laser light different from diffusion characteristic of red and green laser light. Specifically, JP 2019-028085 uses a plurality of rotational diffusion plates with different diffusion characteristics, that is, diffusivity.

However, if the plurality of diffusion plates, particularly rotating diffusion plates, is used as in the projector of JP 2019-028085, the number of parts increases and the size increases.

SUMMARY OF THE DISCLOSURE

An apparatus according to one aspect of the embodiments includes a first emitter configured to emit first color light, a second emitter configured to emit second color, a plate configured to diffuse the first color light and the second color light, a first lens configured to collimate the diffused first color light, and a second lens configured to collimate the diffused second color light. A following inequality is satisfied:

$$1.5 \le f1/f2 \le 9.0$$

where f1 represents a focal length of the first collimator lens, and f2 represents a focal length of the second collimator lens.

An image projection apparatus according to another aspect of the present disclosure includes the above light source apparatus.

Further features of the present disclosure will become apparent from the following description of exemplary embodiments with reference to the attached drawings.

DESCRIPTION OF THE EMBODIMENTS

Referring now to the accompanying drawings, a description will be given of embodiments according to the present disclosure.

First Embodiment

Figure 1:
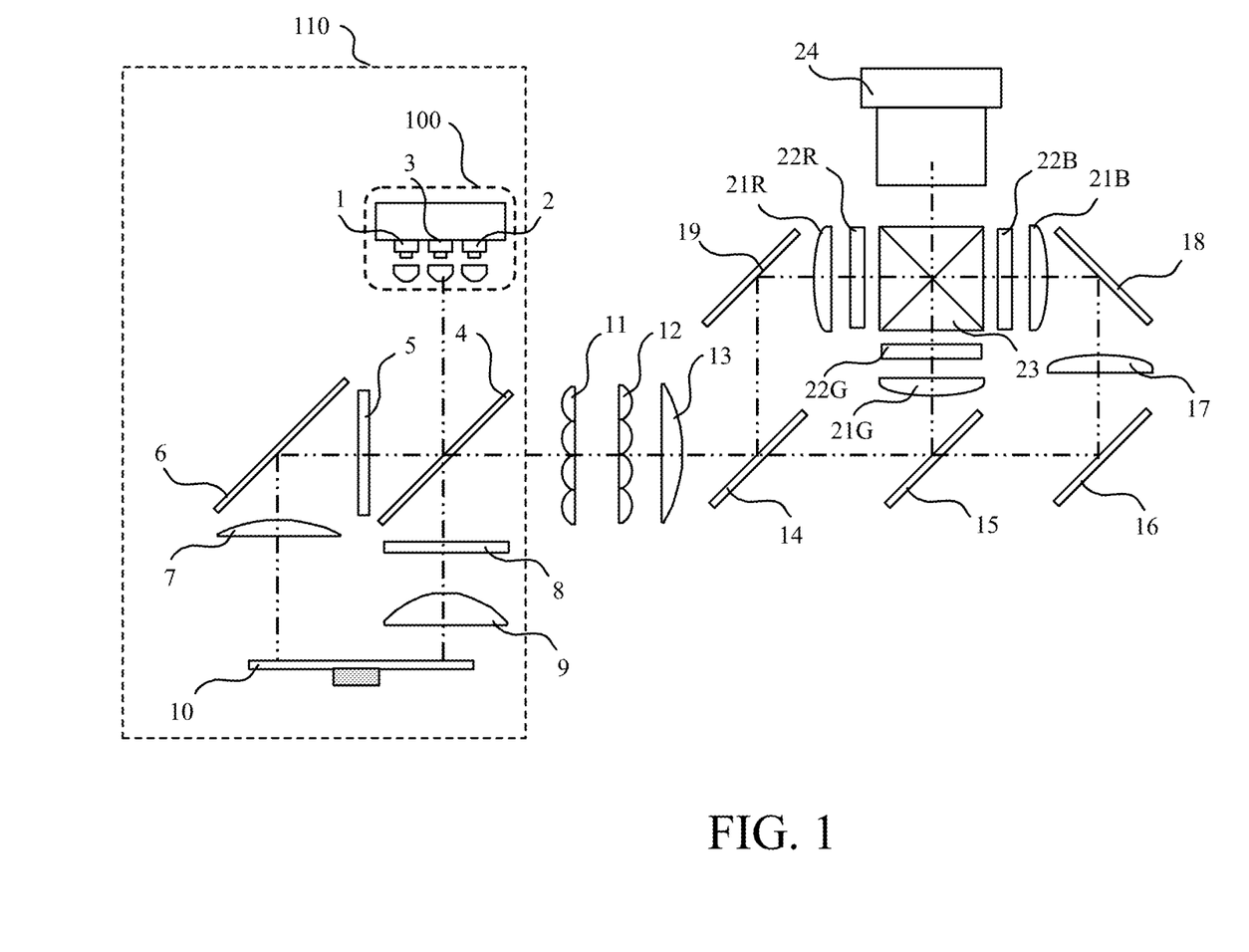
FIG. 1 is a diagram illustrating a configuration of a projector having a light source apparatus according to a first embodiment.

FIG. 1 illustrates a configuration of a projector, which is also referred to as an image projection apparatus, including a light source apparatus 110 according to a first embodiment of the present disclosure. The light source apparatus 110 includes a red (R) laser light source 1, a green (G) laser light source 2, a blue (B) laser light source 3, a polarization beam splitter (PBS) 4, a first λ/4 plate 5, and a first mirror 6, and a first collimator lens 7. The light source apparatus 110 further includes a second λ/4 plate 8, a second collimator lens 9, and a rotational diffusion plate 10.

The projector includes the light source apparatus 110 described above, a first fly-eye lens 11, a second fly-eye lens 12, a collective lens 13, a first dichroic mirror 14 and a second dichroic mirror 15. The projector further includes a second mirror 16, a relay lens 17, a third mirror 18, a fourth mirror 19, field lenses 21 (R, G and B), light modulators 22 (R, G and B), a cross dichroic prism 23, and a projection lens 24.

In the light source apparatus 110, the B-laser light source 3 emits B-light, which is also referred to as first color light and is S-polarized light, and the B light is reflected by the PBS 4 as a separator and is converted into circularly polarized light by the first λ/4 plate 5. The B-light converted into circularly polarized light is reflected by the first mirror 6 and collected on the rotational diffusion plate 10 by the first collimator lens 7. The rotational diffusion plate 10 diffuses the entering laser light by rotating a circular diffusion plate by using a motor, and changes the diffusion pattern with time. Thereby, it is possible to reduce speckle of projected light, which will be projected onto the screen. The B-light diffused and reflected by the rotational diffusion plate 10 is made closer to collimated light, i.e., collimated, by the first collimator lens 7. Thereafter, the B-light is converted into P-polarized light by the first λ/4 plate 5, passes through the PBS 4 as a combiner, and is emitted from the light source apparatus 110.

R-light as third color light and G-light as second color light, which are P-polarized light emitted from the R-laser light source 1 and the G-laser light source 2, respectively, pass through the PBS 4 and are converted into circularly polarized light by the second λ/4 plate 8. The R-light and G-light converted into the circularly polarized light are focused on the rotational diffusion plate 10 by the second collimator lens 9. The R-light and G-light diffused and reflected by the rotational diffusion plate 10 are collimated by the second collimator lens 9 and are converted into S-polarized light by the second λ/4 plate 8. The R-light and G-light converted into the S-polarized light are reflected by the PBS 4 and are emitted from the light source apparatus 110.

The first dichroic mirror 14 has characteristics of reflecting R-light and transmitting G-light and B-light. The second dichroic mirror 15 has characteristics of reflecting G-light and transmitting B-light. The B-light emitted from the light source apparatus 110 enters the light modulator 22B via the first fly-eye lens 11, the second fly-eye lens 12, the collective lens 13, the relay lens 17, and the field lens 21B. The G-light emitted from the light source apparatus 110 enters the light modulator 22G via the first fly-eye lens 11, the second fly-eye lens 12, the collective lens 13 and the field lens 21G. The R-light emitted from the light source apparatus 110 enters the light modulator 22R via the first fly-eye lens 11, the second fly-eye lens 12, the collective lens 13 and the field lens 21R. The light modulators 22R, 22G, and 22B are liquid crystal panels, digital micromirror devices, or the like, and are configured to modulate the entering light based on an image signal input to the projector.

The R-light, G-light, and B-light, which are modulated by the light modulators 22R, 22G and 22B, respectively, are combined by the cross dichroic prism 23 and projected onto a screen or a projection surface (not illustrated) via the projection lens 24.

Figure 2:
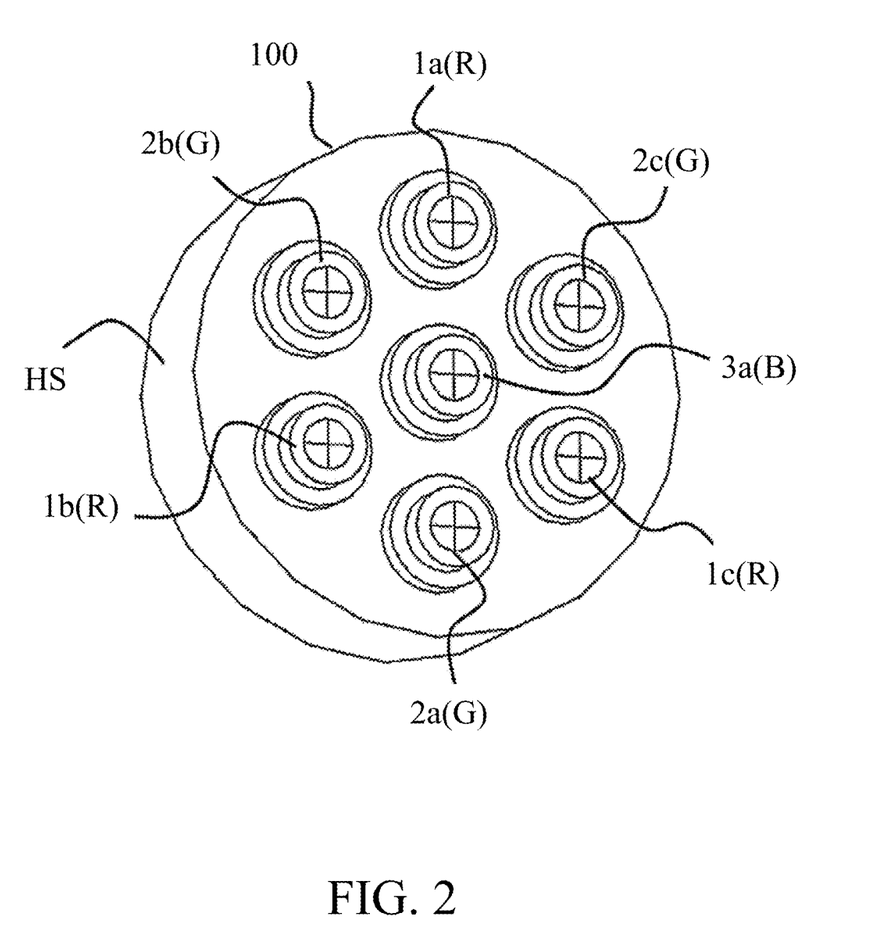
FIG. 2 is a perspective view illustrating a light source unit according to the first embodiment.

FIG. 2 illustrates the laser light source unit 100 including one B-laser light source 3a as a first light emitter, three G-laser light sources 2a, 2b and 2c as second light emitters, and three R-laser light sources 1a, 1b and 1c as third light emitters. Each laser light source includes a CAN package type semiconductor laser. The center wavelength of the R-laser light source 1 is 640 nm, the center wavelength of the G-laser light source 2 is 525 nm, and the center wavelength of the B-laser light source 3 is 455 nm. In the laser light source unit 100, the R-laser light sources 1a, 1b, 1c and the G-laser light sources 2a, 2b and 2c are alternately arranged so that the R-laser light sources 1a, 1b and 1c and the G-laser light sources 2a, 2b and 2c surround the one B-laser light source 3a as the center, and these light sources are integrated in a heat sink HS for cooling the light sources. In FIG. 2, since the light output intensity of the B-laser light source is higher than the respective light output intensities of the R-laser light source and the G-laser light source, at least one B-laser light source is provided, and the plurality of R-laser light sources and the plurality of G-laser light sources are provided, the respective numbers of the R- and G-laser light sources being larger than the number of the B-laser light source. In other words, the number of the B-laser light sources is smaller than the respective numbers of the R-laser light sources and the G-laser light sources. In this embodiment, all of the B-laser light source 3a, the G-laser light sources 2a to 2c, and the R-laser light sources 1a to 1c are made to emit light.

A light beam diameter, or a light beam width, of B-light emitted from the one B-laser light source 3a is smaller than respective light beam diameters of R-light emitted from each of the three R-laser light sources 1a, 1b and 1c and G-light emitted from each of the three G-laser light sources 2a, 2b and 2c. In this embodiment, a focal length f1 of the first collimator lens 7 is different from a focal length f2 of the second collimator lens 9, and thereby the light beam diameter of the B-light diffused by the rotational diffusion plate 10 is made to be the same or almost the same as the respective light beam diameters of the R-light and G-light diffused by the rotational diffusion plate 10. Specifically, the focal lengths f1 and f2 is set so that the following inequality (1) is satisfied.

$$1.5 \leq f1/f2 \leq 9.0 \tag{1}$$

If f1/f2 is smaller than the lower limit of the inequality (1), the light beam diameter of B-light is too small for the respective light beam diameters of R-light and G-light, and if f1/f2 is larger than the upper limit of the inequality (1), the light beam diameter of B-light is too large for the light beam diameters of R-light and G-light.

The following inequality (1a) may be satisfied.

$$1.8 \leq f1/f2 \leq 7.0 \tag{1a}$$

The following inequality (1b) may be satisfied.

$$2.0 \leq f1/f2 \leq 5.0 \tag{1b}$$

A distance, or an optical path length, from the B-laser light source 3 to the rotational diffusion plate 10 in FIG. 1 may be set to be longer than a distance from the R- and G-laser light sources 1 and 2 to the rotational diffusion plate 10, so that a small-sized light source apparatus is realized while the inequality (1) is satisfied. Specifically, the following inequality (2) may be satisfied:

$$1.4 \leq D1/D2 \leq 5.0 \tag{2}$$

where D1 represents an air conversion distance on an optical axis, which is represented by a two-dot chain line, of the first collimator lens 7 between the PBS 4 and the rotational diffusion plate 10 on the optical path of B-light, and D2 represents an air conversion distance on an optical axis of the second collimator lens 9 between the PBS 4 and the rotational diffusion plate 10 on the optical paths of R-light and G-light.

The following inequality (2a) may be satisfied.

$$1.7 \leq D1/D2 \leq 4.5 \tag{2a}$$

The following inequality (2b) may be satisfied.

$$2.0 \leq D1/D2 \leq 4.0 \tag{2b}$$

In this embodiment, a description has been given of a case where the R-laser light source 1 emits R-light of P-polarized light, the G-laser light source 2 emits G-light of P-polarized light, and the B-laser light source 3 emits B-light of S-polarized light. However, the PBS 4 may be a dichroic PBS and all of R-light, G-light, and B-light emitted from the light source apparatus 110 may be one of P-polarized light and S-polarized light. If all of the R-light, G-light, and B-light emitted from the light source apparatus 110 are P-polarized light, the dichroic PBS may have characteristics of transmitting B-light of S-polarized light and R- and G-light of P-polarized light, and reflecting B-light of P-polarized light and R- and G-light of S-polarized light. If all of the R-light, G-light, and B-light emitted from the light source apparatus 110 are S-polarized light, the dichroic PBS may have characteristics of transmitting B-light of P-polarized light and R- and G-light of S-polarized light and reflecting B-light of S-polarized light and R- and G-light of P-polarized light.

Second Embodiment

Figure 3:
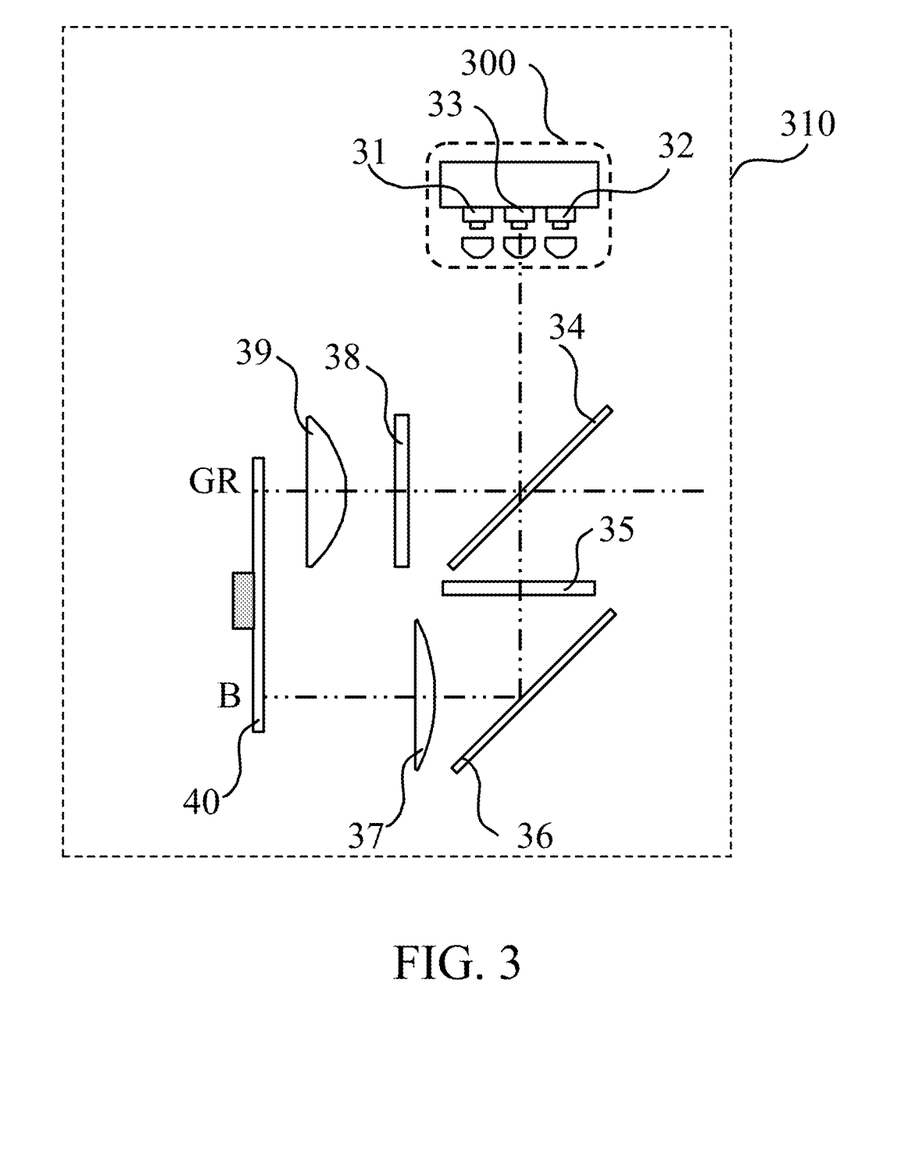
FIG. 3 is a diagram illustrating a configuration of a light source apparatus according to a second embodiment.

FIG. 3 illustrates a configuration of a light source apparatus 310 according to a second embodiment of the present disclosure. The light source apparatus 310 in this embodiment is used in place of the light source apparatus 110 in the projector illustrated in FIG. 1.

The light source apparatus 310 in this embodiment includes an R-laser light source 31, a G-laser light source 32, a B-laser light source 33, a PBS 34, a first λ/4 plate 35, a first mirror 36, a first collimator lens 37, a second λ/4 plate 38, a second collimator lens 39 and a rotational diffusion plate 40.

B-light, which is P-polarized light emitted from the B-laser light source 33, passes through the PBS 34 as a separator and is converted into circularly polarized light by the first λ/4 plate 35. The B-light converted into circularly polarized light is reflected by the first mirror 36 and focused on the rotational diffusion plate 40 by the first collimator lens 37. The B-light diffused and reflected by the rotational diffusion plate 40 is collimated by the first collimator lens 37 and converted into S-polarized light by the first λ/4 plate 35. The B-light converted into S-polarized light is reflected by the PBS 34 as a combiner and emitted from the light source apparatus 310.

R-light and G-light, which are S-polarized light emitted from the R-laser light source 31 and the G-laser light source 32, respectively, are reflected by the PBS 34 and converted into circularly polarized light by the second λ/4 plate 38. The R-light and G-light converted into circularly polarized light are focused on the rotational diffusion plate 40 by the second collimator lens 39. The R-light and G-light diffused and reflected by the rotational diffusion plate 40 are collimated by the second collimator lens 39 and converted into P-polarized light by the second λ/4 plate 38. The R-light and G-light converted into P-polarized light pass through the PBS 34 and are emitted from the light source apparatus 310.

In this embodiment, a focal length f1 of the first collimator lens 37 and a focal length f2 of the second collimator lens 39 may satisfy the inequality (1), (1a), or (1b). Further, the inequality (2), (2a), or (2b) may be satisfied where D1 represents an air conversion distance on an optical axis of the first collimator lens 37 between the PBS 34 and the rotational diffusion plate 40 on the optical path of B-light, and D2 represents an air conversion distance on an optical axis of the second collimator lens 39 between the PBS 34 and the rotational diffusion plate 40 on the optical paths of R-light and G-light.

Third Embodiment

Figure 4:
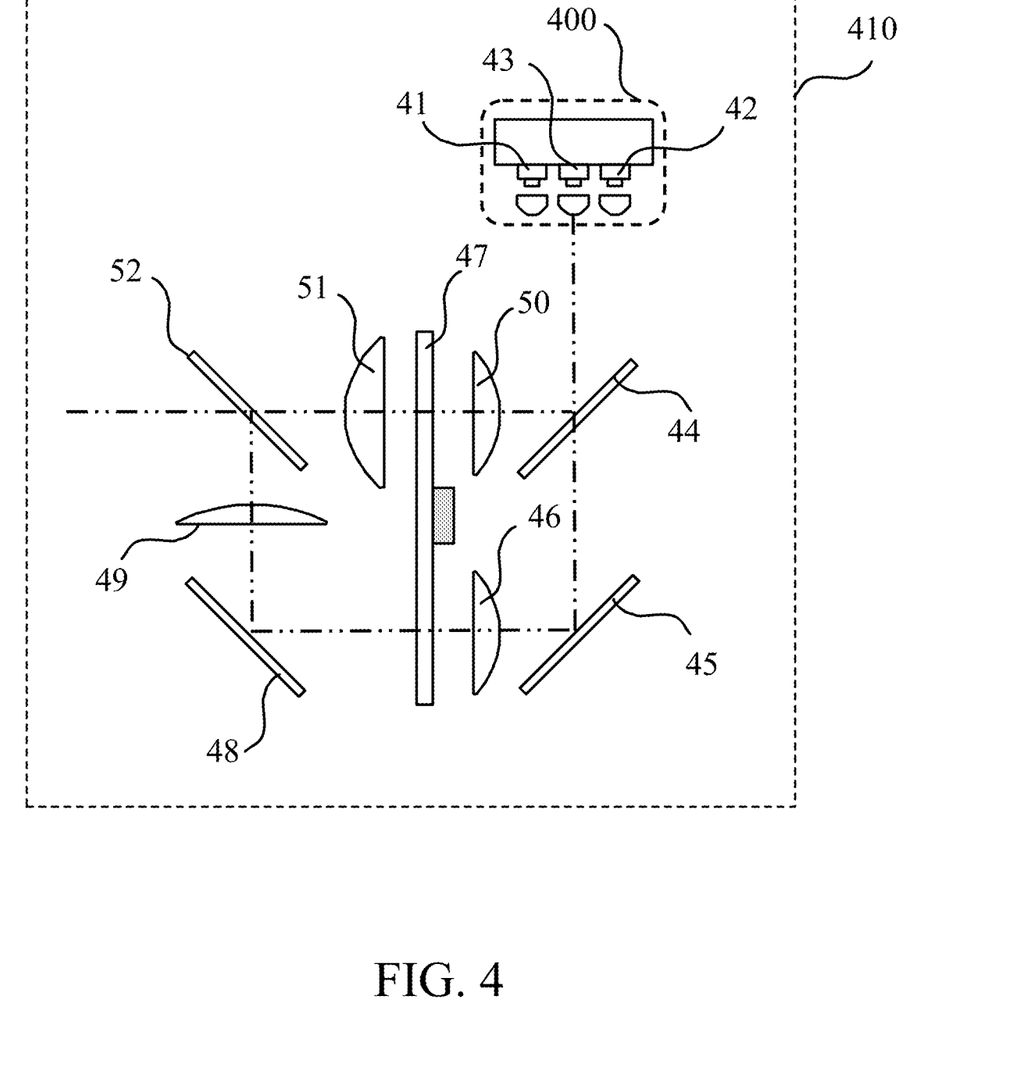
FIG. 4 is a diagram illustrating a configuration of a light source apparatus according to a third embodiment.

FIG. 4 illustrates a configuration of a light source apparatus 410 according to a third embodiment of the present disclosure. The light source apparatus 410 in this embodiment is used in place of the light source apparatus 110 in the projector illustrated in FIG. 1.

The light source apparatus 410 in this embodiment includes an R-laser light source 41, a G-laser light source 42, a B-laser light source 43, a first dichroic mirror 44, a first mirror 45, a first collective lens 46, and a rotational diffusion plate 47. The light source apparatus 410 further includes a second mirror 48, a first collimator lens 49, a second collective lens 50, a second collimator lens 51 and a second dichroic mirror 52. In the first and second embodiments, the rotational diffusion plates 10 and 40 are reflection types, but in this embodiment, the rotational diffusion plate 47 is a transmission type.

B-light emitted from the B-laser light source 43 passes through the first dichroic mirror 44, is reflected by the first mirror 45, and is focused on the rotational diffusion plate 47 by the first collective lens 46. The B-light diffused by and transmitted through the rotational diffusion plate 47 is reflected by the second mirror 48, collimated by the first collimator lens 49, reflected by the second dichroic mirror 52 as a combiner, and emitted from the light source apparatus 410.

R-light and G-light emitted from the R-laser light source 41 and the G-laser light source 42, respectively, are reflected by the first dichroic mirror 44 and focused on the rotational diffusion plate 47 by the second collective lens 50. The R-light and G-light diffused by and transmitted through the rotational diffusion plate 47 are collimated by the second collimator lens 51, transmitted through the second dichroic mirror 52, and emitted from the light source apparatus 410.

In this embodiment, a focal length f1 of the first collimator lens 49 and a focal length f2 of the second collimator lens 51 may satisfy the inequality (1), (1a), or (1b). Further, in this embodiment, the inequality (2), (2a), or (2b) may be satisfied where D1 represents an air conversion distance on an optical axis of the first collimator lens 49 between the rotational diffusion plate 47 and the second dichroic mirror 52 on the optical path of B-light, and D2 represents an air conversion distance on the optical axis of the second collimator lens 51 between the rotational diffusion plate 47 and the second dichroic mirror 52 on the optical paths of R-light and G-light.

Fourth Embodiment

Figure 5:
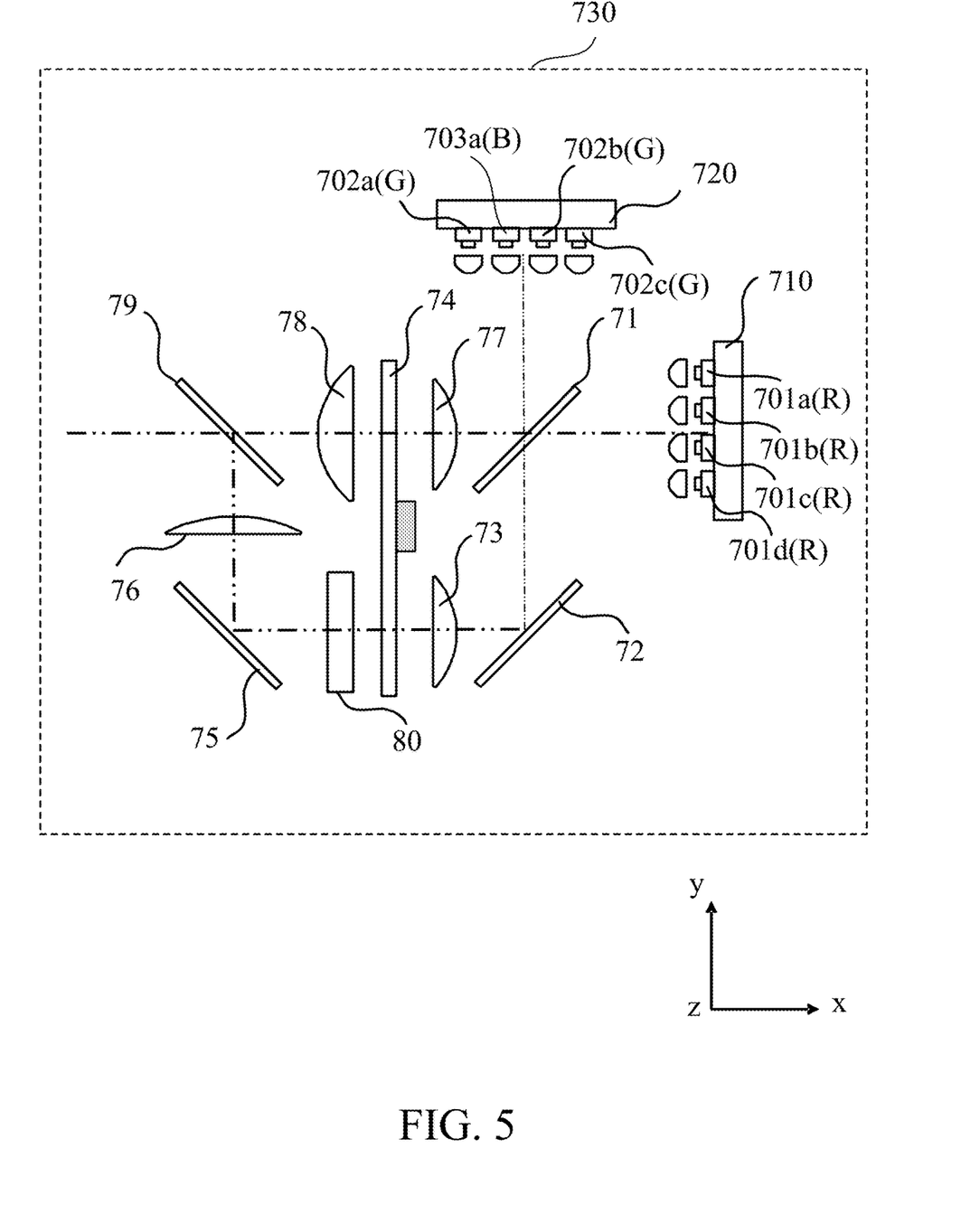
FIG. 5 is a diagram illustrating a configuration of a light source apparatus according to a fourth embodiment.

FIG. 5 illustrates a configuration of a light source apparatus 730 according to a fourth embodiment of the present disclosure. The light source apparatus 730 in this embodiment includes two (first and second) laser light source units 700 and 710, a first dichroic mirror 71, a first mirror 72, a first collective lens 73 and a rotational diffusion plate 74. The light source apparatus 730 further includes a second mirror 75, a first collimator lens 76, a second collective lens 77, a second collimator lens 78, a second dichroic mirror 79 and a third collimator lens 80.

Figure 6A:
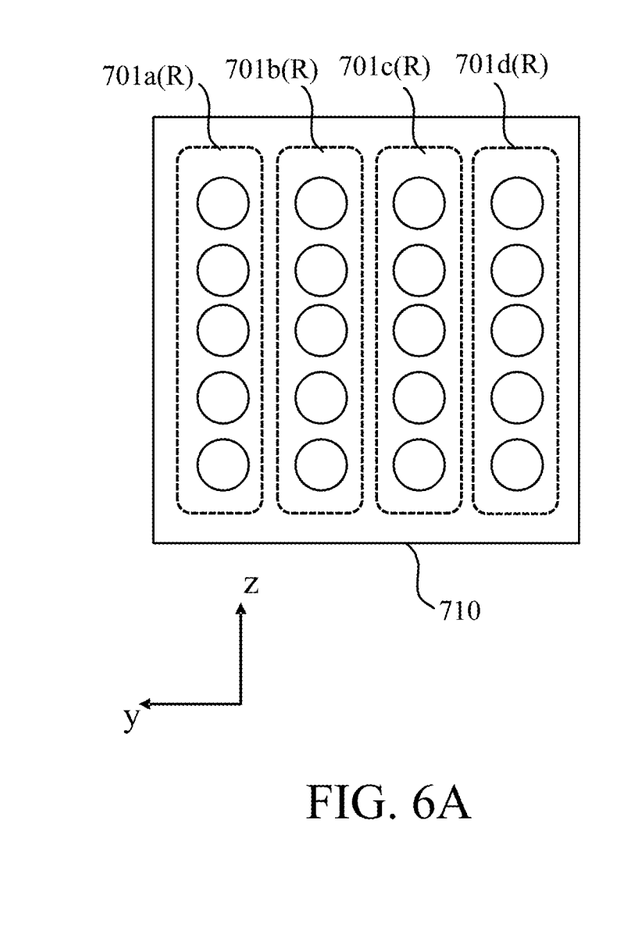
FIGS. 6A and 6B are diagrams illustrating a configuration of a laser light source unit according to the fourth embodiment.
Figure 6B:
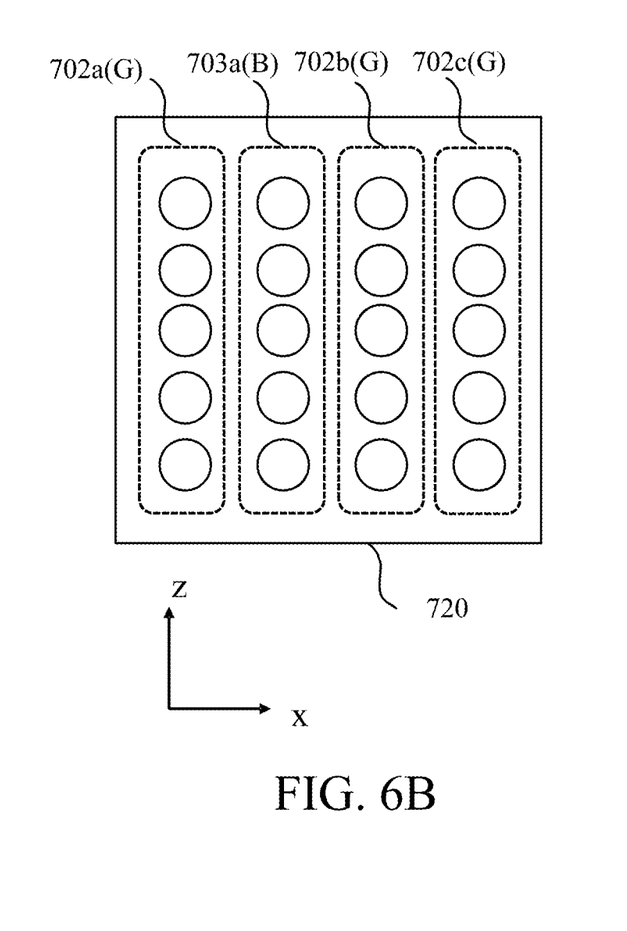

FIG. 6A illustrates a configuration of the first laser light source unit 710, and FIG. 6B illustrates a configuration of the second laser light source unit 720. The first laser light source unit 710 includes four R-laser light source subunits 701a to 701d in each of which a plurality of (five in the drawing) R-laser light sources are arranged in a row in a vertical direction, that is, a z direction. The second laser light source unit 720 includes three G-laser light source subunits 702a to 702c in each of which a plurality of (five in the drawing) G-laser light sources are arranged in a row in the vertical direction, and one B-laser light source subunit 703a in which a plurality of (five in the drawing) B-laser light sources are arranged in a row in the vertical direction. The B-laser light source subunit 703a is located between the G-laser light source subunits 702a and 702b in a lateral direction, that is an x direction.

R-light emitted from the four R-laser light source subunits 701a to 701d of the first laser light source unit 710 passes through the first dichroic mirror 71 and is focused on the rotational diffusion plate 74 by the second collective lens 77. The B-light diffused by and transmitted through the rotational diffusion plate 74 is collimated by the second collimator lens 78, transmitted through the second dichroic mirror 79, and emitted from the light source apparatus 730.

G-light emitted from the G-laser light source subunits 702a to 702c of the second laser light source unit 720 is reflected by the first dichroic mirror 71 and focused on the rotational diffusion plate 74 by the second collective lens 77. The G-light diffused by and transmitted through the rotational diffusion plate 74 is collimated by the second collimator lens 78, transmitted through the second dichroic mirror 79, and emitted from the light source apparatus 730.

B-light emitted from the B-laser light source subunit 703a of the second laser light source unit 720 passes through the first dichroic mirror 71, is reflected by the first mirror 72, and is focused on the rotational diffusion plate 74 by the first collective lens 73. The B-light diffused by and transmitted through the rotational diffusion plate 74 enters the second dichroic mirror 79 via the third collimator lens 80, the second mirror 75, and the first collimator lens 76. The B-light is collimated by the third collimator lens 80 and the first collimator lens 76.

The first collimator lens 76 is a cylinder lens and has power in an xy plane. The third collimator lens 80 is a cylinder lens and has power in an xz plane. Therefore, the third collimator lens 80 collimates the B-light in a column direction, i.e., a z direction in FIG. 6B, and the first collimator lens 76 collimates the B-light in a direction orthogonal to the column direction, i.e., an x direction in FIG. 6B, the B-light having been emitted from the B-laser light source subunit 703a.

The B-light collimated as described above and reflected by the second dichroic mirror 79 is emitted from the light source apparatus 730.

In this embodiment, conditions of the following inequalities may be satisfied:

$$1.5 \leq f1/f2 \leq 9.0 \quad (1)$$

$$0.7 \leq f2/f3 \leq 1.4 \quad (3)$$

where f1 represents a focal length in the xy plane of the first collimator lens 76 having power in the xy plane, f2 represents a focal length of the second collimator lens 78, and f3 represents a focal length in the xz plane of the third collimator lens 80 having power in the xz plane. f1/f2 may satisfy the conditions of the inequalities (1a) and (1b). f2/f3 may satisfy conditions of the following inequalities.

$$0.8 \leq f2/f3 \leq 1.2 \quad (3a)$$

$$0.9 \leq f2/f3 \leq 1.1 \quad (3b)$$

Further, the inequality (2), (2a), or (2b) may be satisfied where D1 represents an air conversion distance on an optical axis of the first and third collimator lenses 76 and 80 between the rotational diffusion plate 74 and the second dichroic mirror 79 on the optical path of B-light, and D2 represents an air conversion distance on an optical axis of the second collimator lens 78 between the rotational diffusion plate 74 and the second dichroic mirror 79 on the optical paths of R-light and G-light.

Fifth Embodiment

Figure 7A:
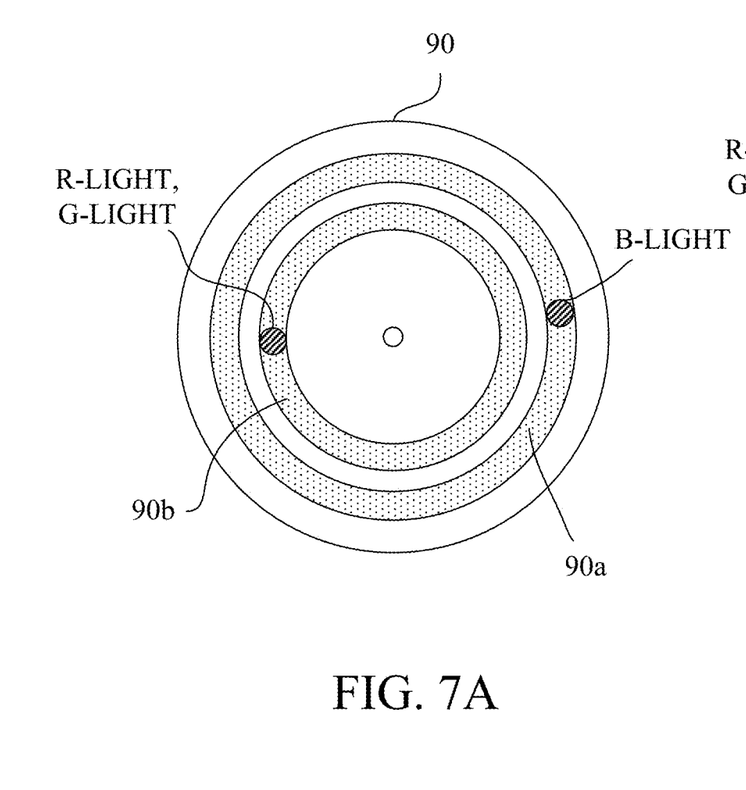
FIGS. 7A and 7B are diagrams illustrating a rotational diffusion plate of a light source apparatus according to a fifth embodiment.
Figure 7B:
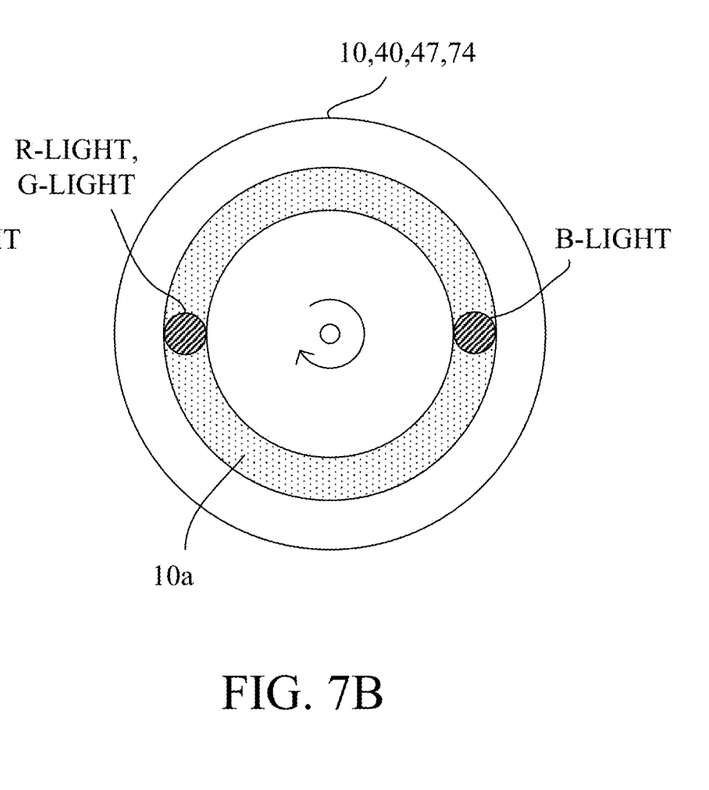

FIG. 7A illustrates a rotational diffusion plate 90 used in a light source apparatus according to a fifth embodiment of the present disclosure. As illustrated in FIG. 7B, each of the rotational diffusion plates 10, 40, 47, and 74 used in the first to fourth embodiments has one annular diffusion area 10a continuous in a rotational direction, the diffusion area 10a being configured to diffuse entering light, and B-light, G-light, and B-light are all diffused in the same diffusion area 10a with the same diffusivity.

On the other hand, the rotational diffusion plate 90 in this embodiment has a first diffusion area 90a configured to diffuse B-light and a second diffusion area 90b configured to diffuse R-light and G-light, the first and second diffusion areas 90a and 90b having annular shapes and being concentric. The first diffusion area 90a and the second diffusion area 90b have diffusion patterns different from each other. When the light source illustrated in FIG. 2 is used, R-light and G-light enter the diffusion plate from the periphery, and therefore a center intensity is insufficient if the diffusion plate diffuses light with a normal Gaussian distribution. The diffused light from the diffusion plate spreads in a Gaussian distribution with respect to a main ray of the entering light. That is, when R-light and G-light enter the diffusion plate at an incident angle of 10°, the intensity of the diffused light is strong in the 10° direction. On the other hand, B-light enters the diffusion plate at an incident angle of 0°, and thus the intensity of diffused light is strong in the 0° direction. Hence, a diffusion plate may be used of a structural type (for example, CGH) with an optimized diffusion angle distribution.

On the other hand, when the light source illustrated in FIGS. 6A and 6B are used, a light beam of B-light is narrow in a lateral direction. Thus, an elliptical diffusion plate may be used in which diffusivity in the lateral direction is larger than the diffusivity in the vertical direction so that widths of light beams match.

Each embodiment explained above can reduce the color unevenness of emitted light from the light source apparatus without using a plurality of rotational diffusion plate, and can provide the projector capable of projecting an image with reduced color unevenness.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-165336, filed on Sep. 30, 2020 which is hereby incorporated by reference herein in its entirety.

What is claimed is:

1. An apparatus comprising:
   a first emitter configured to emit first color light;
   a second emitter configured to emit second color light;
   a plate configured to diffuse the first color light and the second color light;
   a first lens configured to collimate the diffused first color light; and
   a second lens configured to collimate the diffused second color light,
   wherein a following inequality is satisfied:

$$1.5 \leq f1/f2 \leq 9.0$$

where f1 represents a focal length of the first lens, and f2 represents a focal length of the second lens.

2. The apparatus according to claim 1,
   wherein there are a plurality of second emitters, and
   wherein a number of the first emitter emitting light is smaller than a number of the second emitters emitting light.

3. The apparatus according to claim 1,
   wherein there are a plurality of second emitters, and wherein the plurality of second emitters are arranged so that the plurality of second emitters surround the first emitter as a center.

4. The apparatus according to claim 1,
wherein there are a plurality of second emitters, and
wherein the first emitter is disposed between the plurality of second emitters.

5. The apparatus according to claim 1,
wherein the plate diffuses the first color light and the second color light in a diffusion area having the same diffusivity.

6. The apparatus according to claim 1,
wherein the plate includes a first area and a second area having respective patterns different from each other as areas configured to diffuse the first color light and the second color light, respectively.

7. The apparatus according to claim 5,
wherein the plate rotates and has the area continuous in a rotational direction.

8. The apparatus according to claim 1, further comprising a third emitter configured to emit third color light,
wherein there are a plurality of third emitters, and
wherein a number of the first emitter emitting light is smaller than a number of the third emitters emitting light.

9. The apparatus according to claim 1, further comprising a combiner configured to combine the first color light emitted from the first lens and the second color light emitted from the second lens,
wherein a mirror configured to reflect the first color light is disposed between the plate and the combiner.

10. The apparatus according to claim 9,
wherein a following inequality is satisfied:

$$1.4 \leq D1/D2 \leq 5.0$$

where D1 represents an air distance between the plate and the combiner on a path of the first color light, and D2 represents an air distance between the plate and the combiner on a path of the second color light.

11. A projection apparatus comprising:
an apparatus; and
a modulator configured to modulate light emitted from the apparatus,
wherein the apparatus includes:
a first emitter configured to emit first color light;
a second emitter configured to emit second color light;
a plate configured to diffuse the first color light and the second color light;
a first lens configured to collimate the diffused first color light; and
a second lens configured to collimate the diffused second color light, and wherein a following inequality is satisfied:

$$1.5 \leq f1/f2 \leq 9.0$$

where f1 represents a focal length of the first lens, and f2 represents a focal length of the second lens.

12. The projection apparatus according to claim 11,
wherein there are a plurality of second emitters, and
wherein a number of the first emitter emitting light is smaller than a number of the second emitters emitting light.

13. The projection apparatus according to claim 11,
wherein there are a plurality of second emitters, and
wherein the plurality of second emitters are arranged so that the plurality of second emitters surround the first emitter as a center.

14. The projection apparatus according to claim 11,
wherein there are a plurality of second emitters, and
wherein the first emitter is disposed between the plurality of second emitters.

15. The projection apparatus according to claim 11,
wherein the plate diffuses the first color light and the second color light in a diffusion area having the same diffusivity.

16. The projection apparatus according to claim 11,
wherein the plate includes a first area and a second area having respective patterns different from each other as areas configured to diffuse the first color light and the second color light, respectively.

17. The projection apparatus according to claim 15,
wherein the plate rotates and has the area continuous in a rotational direction.

18. The projection apparatus according to claim 11, further comprising a third emitter configured to emit third color light,
wherein there are a plurality of third emitters, and
wherein a number of the first emitter emitting light is smaller than a number of the third emitters emitting light.

19. The projection apparatus according to claim 11, further comprising a combiner configured to combine the first color light emitted from the first lens and the second color light emitted from the second lens,
wherein a mirror configured to reflect the first color light is disposed between the plate and the combiner.

20. The projection apparatus according to claim 19,
wherein a following inequality is satisfied:

$$1.4 \leq D1/D2 \leq 5.0$$

where D1 represents an air distance between the plate and the combiner on a path of the first color light, and D2 represents an air distance between the plate and the combiner on a path of the second color light.

* * * * *